Feb. 16, 1971 J. N. LANERI 3,562,892
APPARATUS FOR PRODUCING LINK MEANS FOR JOINING
ENDS OF BELTING MATERIAL
Filed Sept. 3, 1968 3 Sheets-Sheet 1

James N. Laneri
INVENTOR.

BY *Rupert S. Minns*
ATTORNEY

Feb. 16, 1971  J. N. LANERI  3,562,892
APPARATUS FOR PRODUCING LINK MEANS FOR JOINING
ENDS OF BELTING MATERIAL
Filed Sept. 3, 1968  3 Sheets-Sheet 2

James N. Laneri
INVENTOR.

BY Rupert S. Minne
ATTORNEY

Feb. 16, 1971 J. N. LANERI 3,562,892
APPARATUS FOR PRODUCING LINK MEANS FOR JOINING
ENDS OF BELTING MATERIAL
Filed Sept. 3, 1968 3 Sheets-Sheet 3

James N. Laneri
INVENTOR.

BY Rupert G. Minns
ATTORNEY

United States Patent Office

3,562,892
Patented Feb. 16, 1971

3,562,892
APPARATUS FOR PRODUCING LINK MEANS FOR JOINING ENDS OF BELTING MATERIAL
James N. Laneri, 5266 40th St. S.,
St. Petersburg, Fla. 33711
Filed Sept. 3, 1968, Ser. No. 756,944
Int. Cl. B23p 11/00
U.S. Cl. 29—243.51    13 Claims

ABSTRACT OF THE DISCLOSURE

Apparatus for producing continuous tape means for joining ends of continuous conveyor belt or like material, includes means for crimping angularly disposed arms of series of apertured links, to embed barbed ends of arms into one edge of a continuous tape. Includes indexing mechanism for progressively moving successive links into position between relatively movable upper and lower crimping heads. Edge of tape is pressed firmly between arms of links into rigid contact with shoulder part of link, in timed relation to reciprocating crimping heads to deform link arms inwardly into tight engagement with opposite sides of the belt material, anchoringly to embed barbs of arms into the tape material. Uniformly spaced link eyelets in said tape when fastened are interengagable in alternation to align slots of axially aligned openings of eyelets, for reception of elongated hinge cable attached to a threading shuttle, moved through aligned eyelet apertures by means of shuttle extension movable through aligned eyelet slots.

BACKGROUND OF INVENTION

The prior J. B. Nasworthy Pat. No. 3,280,435 discloses "Systems for Linking Ends of Material," such as continuous drier belt or other belt materials. Prior art machines available for crimping pronged metal links or fasteners onto ends of belts have not been satisfactory for efficient large scale production of continuous belting, however, generally because no way was provided to assure uniform compression of opposing prongs into the material, there being no way to prevent the links from turning in recessed holders for the same. This condition was usually aggravated by the fact that the material was fed loosely between a pair of movable crimping jaws, and generally required considerable manual control of both the crimping mechanisms and the material fed into the same, so that uniform crimping and link spacing was not always attainable. No suitable crimping apparatus has been available on the market for applying the improved belt links of the present invention, especially when the same have oppositely disposed barbed arms of different lengths.

SUMMARY OF INVENTION

The present invention deals with improved apparatus for crimping links into edge portions of tape material. The links are securely positioned in uniformly spaced recesses of a carrier, which progressively moves successive series of a given number of spaced links into the path of a pair of relatively movable crimping heads and progressively movable, edgewise disposed tape material. Simultaneously, with firm movement of the edge of the material into a fixedly gripped position within aligned jaws, defined by angularly opposed barbed arms of the respective links of each successive series thereof, the crimping heads are strongly urged toward each other to force the barbed arms into strong embrace with the corresponding edge portion of material, with the barbs being anchoringly embedded therein. During this crimping cycle the links are held against rotational movement in the recesses in the carrier, by projections in the same complementally received in passages in apertured eyelet portions of the links, designed to facilitate subsequent joining of belt ends by insertion of a pintlelike cable through aligned apertures of the mated links.

An object of the invention is to provide improved belting link means of the character described, and apparatus for automatically affixing successive series of the same along one edge of tape material in accurately located, uniformly spaced relationship for accurate interengagement with like applied links on the opposite end of belting material to produce a continuous belt.

Other objects of the invention will be manifest from the following brief description and the accompanying drawings.

Figure 6:
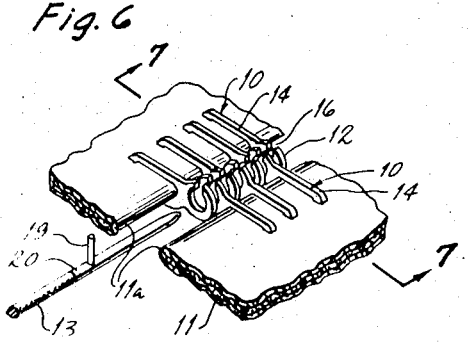
FIG. 6 is a fragmentary, perspective view, partly in section, illustrating oppositely edgewise disposed tapes with attached links intermeshed to align eyelets thereof, for reception of a pintle-stringing tool, for joining two ends of continuous belting, after tapes have been sewn or otherwise securely fastened to said belt ends.
Figure 7:
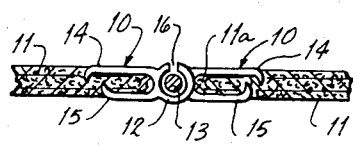
FIG. 7 is a transverse cross section taken substantially on the line 7—7 of FIG. 6, but after insertion of the link connecting pintle.

The apparatus of the present invention is for applying series of spaced fastening links to the edge of continuous tapes or to tape fabric material 11, as shown in FIGS. 7 and 6. Lengths of such tapes with spaced links 10 thereon are attachable to the ends of the belts in known manner.

Each link 10 may be of improved type comprising a thin body, of stainless steel or other deformable material, provided with an apertured portion defining an eyelet 12 for reception therethrough of an elongated pintle or pivotal cable 13, and a pair of integral deformable arms 14 and 15 of unequal length, originally extending freely from a peripheral portion of the eyelet in angularly divergent relationship from said edge portion within the plane of the eyelet. The arms terminate in staggered, oppositely inturned barbs 16 and 17, adapted to be embedded in the fabric tape 11 when the arms are deformed, in a manner to be described later, into embracing relation to the marginal edge of the tapes, as shown in FIGS. 6 and 7.

As best shown in FIG. 6, axially aligned eyelets 16 of series interengaged links affixed on opposed edges of flatwise disposed tapes, have radial slots 16 in the eyelets in axial alignment for reception therethrough of a handle 19 extending angularly from an elongated, slender shuttle tool 20 to thread the latter axially through the apertures of the aligned eyelets, and thereby to thread the temporarily attached pintle cable 13 through the eyelets to retain the links in the pivotally connected relationship shown in FIG. 7.

Figure 5:
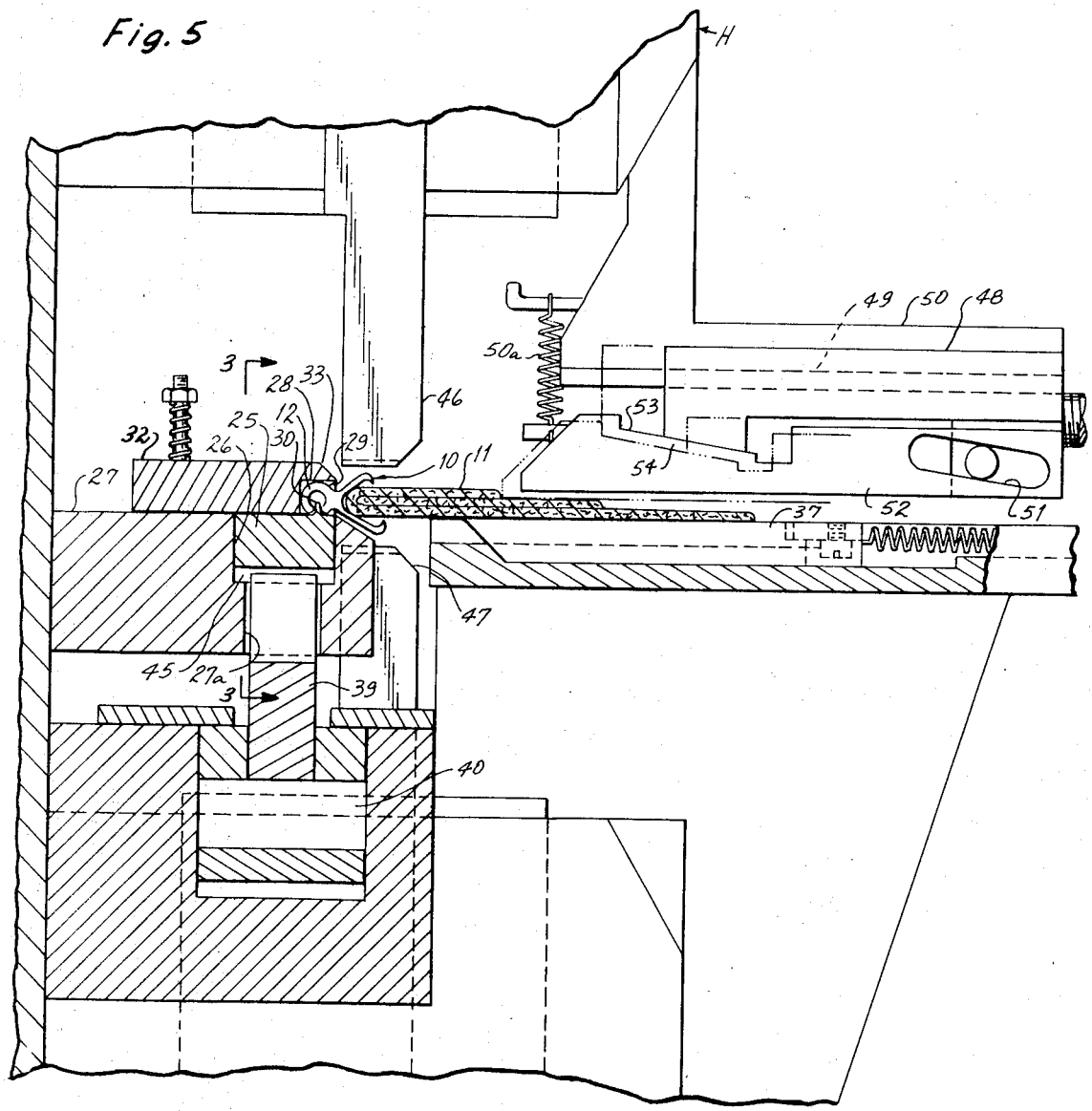
FIG. 5 is a greatly enlarged, fragmentary cross section of a part of FIG. 2, but illustrating the tape edge positioning and link-crimping mechanism in a preliminary stage of a link-crimping operation.

Referring now to the link-applying apparatus, generally as shown in FIGS. 1 to 5, the numeral 25 designates an elongated link carriage of rectangular cross section, which is longitudinally slidably received in a guide recess 26 in a relatively fixed supporting plate 27, the latter having an elongated slot 27a in the underside thereof, communicating with the underside of the carriage 25. Along the upper side of the carriage 25 is shown an extension 28 of square cross section, in which are provided equally spaced recesses 29, 29 for fairly snug reception of the eyelet portions 12 of links 10, each recess 29 having therein an upwardly projecting narrow fin 30 integral with the carriage 25, for snug reception in the slot 16 of a link 10 positioned in its recess 29, as shown in FIG. 5. A spring-pressed retaining bar 32 affixed on supporting plate 27, has a portion 33 overlying rib 28 for retaining the links 10 positioned as shown in FIG. 5, wherein it is seen that fin 30 prevents rotational movement of the link, and retains the link arms 14 and 15 in predetermined angular relationship effective to facilitate proper reception of the edge 11a of a tape 11 into stop engagement thereof with open jaw portions defined by the open link arms.

Figure 1:
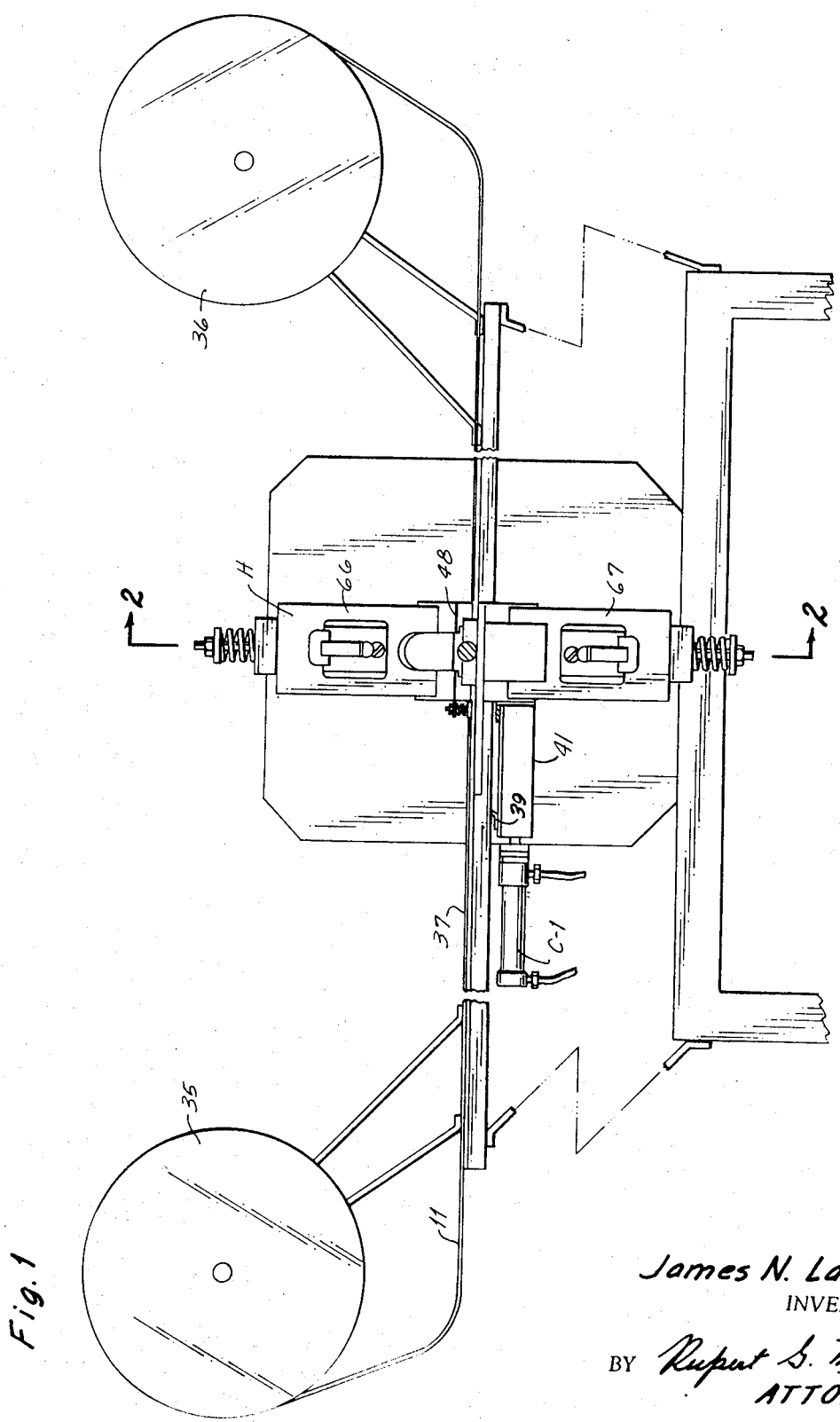
FIG. 1 is a front elevation, partly broken away and in section, of a machine for crimping apertured links onto one edge of tape material for attachment to ends of conveyor or like belts.
Figure 3:
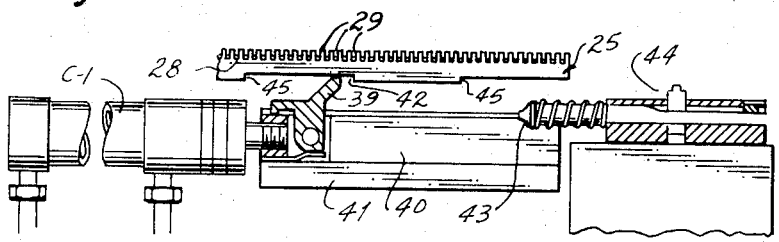
FIG. 3 is a further enlarged, fragmentary cross section, taken substantially on the line 3—3 of FIG. 5, and illustrating hydraulically operated means for indexing a link supply carriage or rack.
Figure 4:
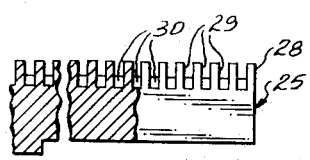
FIG. 4 is a greatly enlarged, fragmentary view, partly broken away and in section, of the leading end portion of the link carriage shown in FIG. 3.

As best shown in FIGS. 1 and 5, the tape 11 is suitably fed from a supply roll 35 thereof to takeup roll 36, to move a slack extent of the tape over a relatively fixed flat table 37 (see FIG. 1) to successive stopped positions in which the edge 11a of the fabric tape is positioned within jaws defined by the angularly extended arms 14 and 15 of each of a series of aligned links 12 positioned on the carriage as previously described (see FIG. 5). At this point the machine may be considered momentarily in static condition with particular reference to the mechanisms as shown in FIGS. 3 and 5. The rolls 35 and 36 may, for example, be slowly, periodically driven by known means (not shown), which will maintain a certain degree of slack in the material 11.

Figure 8:
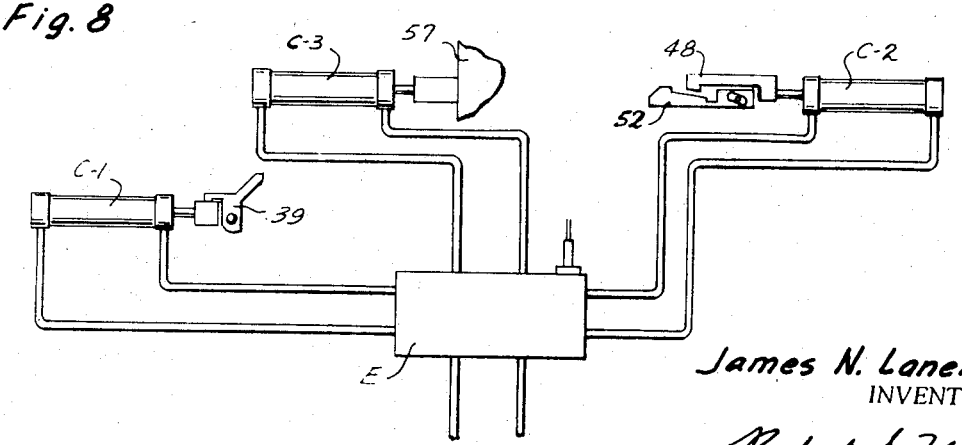
FIG. 8 is a schematic, electro-hydraulic diagram showing the manner in which automatic operation of the tape positioning and link-crimping mechanism of FIGS. 1 to 5 is controlled.

By means of a known type of electro-hydraulic timing mechanism, indicated at E in FIG. 8, a series of successive and/or simultaneous operations may take place. First, a hydraulic piston cylinder C–1 is actuated to move link carrier 25 in the guide portion 26 of supporting plate 27, through movement of a pivoted, spring-pressed latch 39 on a slide member 40 in a relatively fixed part 41, to engage one of a series of spaced, latch-engaging shoulders 42 on the underside of the carrier. As the so engaged latch 39 moves forward with member 25, it engages a spring-pressed cam pin 43 (see FIG. 3), to elevate a stop pin 44 into the path of a stop shoulder 45 on the underside of carrier, corresponding to the respective shoulder 42 engaged by the latch, and thereby to stop the sliding movement of the carrier in positively indexed position in which a given number of links are positioned between a pair of relatively movable, top and bottom, notched crimping heads 46 and 47, respectively, in the vertically spaced apart, inoperative relationship thereof shown in FIG. 5.

Next, the piston-cylinder C–2 is actuated by the control E to move a cam part 48 horizontally along a slide connection thereof, indicated at 49, with a relatively fixed slide part 50 on a relatively fixed head H in which crimping head 46 is vertically reciprocable. Cam part 48 has a pin in cam-slot connection 51 with an outer end of tape-clamping shoe 52, the inner end of which has an upwardly and inwardly inclined cam face 53 yieldingly held by tension spring means 50a in complemental engagement with a likewise inclined face 54 on cam part 48. The pivotal cam slot 51 is at an appropriate angle corresponding to the angle of cam face 53, so that with said inward movement of the cam part 48, the shoe 52 is urged inwardly and downwardly to clamp the tape 11 firmly against the table 37, while at the same time urging tape 11 inwardly into edgewise tight engagement with the inner portions of the now open jaws defined by the arms 14 and 15 of the prepositioned links (see chain-dotted line position of shoe in FIG. 5).

Figure 2:
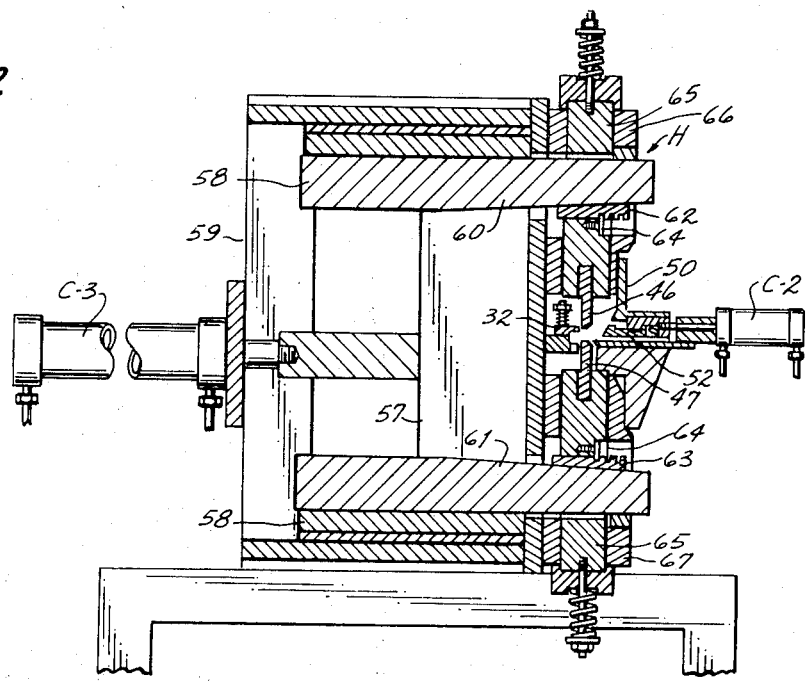
FIG. 2 is an enlarged vertical cross section, partly broken away, taken substantially on the line 2—2 of FIG. 1, showing the tape edge positioning and link-crimping mechanism, generally.

Referring to FIG. 2 in conjunction with FIG. 5, the piston-cylinder C–3 is now operable by the automatic control E, momentarily to reciprocate a cross-head 57 along parallel guide plates 58, 58 of a relatively fixed frame part 59. Oppositely inclined top and bottom guide portions 60 and 61 on the cross-head 57 are complementally engaged by inclined guide faces of guide shoes 62 and 63 axially adjustably connected at 64, 64 to the top and bottom, spring-pressed holders 65, 65 for the top and bottom crimping heads 46 and 47, respectively, these holders 65 being vertically reciprocable in top and bottom guide members 66 and 67, carried by frame part 59. Reciprocation of cross-head 57 thereby applies powerful sliding plane action upon guide shoes 62 and 63 to urge the holders 65 and 66 toward each other, momentarily to engage the notched ends of crimping heads with the barb-arms 14 and 15 of each link 10 of the previously positioned series thereof. The inclined faces of elements 61 and 63 have a greater angle than those on 60 and 62 to accelerate the movement of crimping head 47 so that arms 14 and 15 of link 10, which are of unequal length, will reach the closed or anchored position simultaneously. Accordingly, the arms 14 and 15 are thereby deformed oppositely inward, and into a permanently firm embrace with the marginal edge of tape 11, in which the barbed ends of the arms are anchoringly embedded in the tape material (see FIGS. 6 and 7). Control E then immediately reverses operation of piston-cylinder C–1 to return shoe 52 to the full line, unclamped condition shown in FIG. 5.

Immediately upon release of shoe 52 from tape 11, the control E will automatically repeat the cycle of operation starting with predetermined advance of the tape toward the takeup roll by the piston-cylinder C–1 and through to the link-crimping operation, until the required production of tape material 11 is completed.

In use of the apparatus described in substantial detail above, prefabricated textile tape material 11, produced for attachment to the ends of fabric or other types of belting, is continuously fed from the supply roller 35 to the takeup roll 36, to have a slack extent of tape 11 continuously presented flatwise along table 37 (as shown in FIG. 1) to have a rounded outer edge thereof presented edgewise toward carriage 25 in the guide means of the fixed plate 27. The electro-hydraulic control E (see FIG. 8) is then started for a given number of successive cycles of operation of the apparatus, each cycle including carriage-advancing tape-clamping, and link-crimping operations.

The control E of FIG. 8 first actuates piston cylinder C–1 to advance carriage 25, as previously described, by engagement of the moving, spring-pressed pawl 39 with a shoulder 42 of the carriage. The carriage is thus moved a given extent determined by a stop shoulder 45 coming into engagement with a relatively fixed stop pin 44. This limited forward movement of carriage 25 accurately positions a predetermined number of spaced links 10, prearranged in slots of the carriage, in vertical alignment between the retracted top and bottom crimping heads 46 and 47, in which angularly disposed arms 14 and 15 of the links are vertically aligned with closely spaced slots in the forming ends of the crimping heads, as shown in FIG. 5.

At this point the controller E actuates piston-cylinder C–2, and through powerful cam actuated, inward movement of shoe 52 downwardly to clamp the tape firmly on the table, while at the same time urging the tape into firm edgewise engagement with the jaw portions of the affected links 10 defined by the angularly disposed arms 14 and 15 thereof (see FIG. 5).

With the tape 11 thus firmly positioned and gripped, control E now actuates piston-cylinder C–3 for momentary reciprocation of crimping heads 46 and 47, toward and from engagement with the angularly disposed arms 14 and 15 of accurately positioned spaced links 10. The crimping heads thereby engage and deform the arms from the relative condition shown in FIG. 5 to the anchoringly gripped condition best shown in FIGS. 6 and 7, which illustrates two edges of tape material 11 joined or being joined by a pintle or cable 13.

In any event, the above described three major operational steps are automatically repeated as necessary to crimp successive series of a given number of links 10 onto the edge of the progressively moved tape 11. For this purpose, it will be noted that each time the carriage 25 is moved a distance determined by engagement of the successive stop shoulders 45 with the stop pin 44, and that with each increment of movement of the carrier, the tape 11 will be advanced an equal increment through the connection of crimped links on the tape, which is also connected or keyed to the carriage 25, by interlocking of the link eyelets to the fins 30 (see FIG. 5). The steps of the crimping cycle can be accomplished separately by selective operation of the piston-cylinders, by manual control as well as automatically, as described above.

Short lengths of the completed tape 11 from the takeup roll are sewed or otherwise attachable to ends of a continuous belt to be joined by interengagement of oppositely disposed links 10, as shown in FIG. 6, and insertion of a flexible cable or pintle 13 through the aligned eyelets 16, as described above (see FIG. 7).

Modifications of the invention may be resorted to without departing from the spirit of the invention or the scope of the appended claims.

What is claimed is:

1. Apparatus for applying series of fastening elements to edge portions of material, such as in belting, for joining like edge portions, wherein the fastening elements are links of the type having aperatured portions and pairs of deformable arms originally extending freely therefrom, comprising: relatively movable crimping heads; movable means for supporting series of spaced said links with the apertured portions thereof for in axial alignment and said arms extended freely to form a corresponding series of aligned open jaws; means for holding said material with the edge portion thereof received in aligned jaws of the series of spaced links; and means for relatively moving said crimping heads to crimp the pairs of arms together to embrace the edge portions of the material; said movable means including a carrier provided with spaced recessed portions for receiving the links therein and including keying means cooperating with portions of the links to retain the same with said jaws thereof in alignment for said reception of said edge portion of material therein; said keying means being spaced portions on the carrier complementally engaging locking portions on the links, and including indexing means operable progressively to move successive series of spaced links into cooperative relation between said crimping heads.

2. Apparatus for applying series of fastening elements to edge portions of material, such as in belting, for joining like edge portions, wherein the fastening elements are links of the type having apertured eyelet portions provided with radial slots, and pairs of deformable arms originally extending freely from the eyelet portions, comprising: relatively movable crimiping heads; movable means for supporting series of spaced said links with the eyelet portions thereof in axial alignment, with said arms extended freely to form a corresponding series of aligned open jaws, and with the radial slots in the eyelet portions coextending; means for holding said material with the edge portion thereof received in aligned jaws of the series of spaced links; and means for relatively moving said crimping heads to crimp the pairs of arms together to embrace the edge portions of the material; said movable means including a carrier provided with spaced recessed portions for receiving the links therein and including keying means complemental reception in said radial slots of the links to retain the same with said jaws thereof in alignment for said reception of said edge portion of material therein.

3. Apparatus as in claim 1, said means for holding including relatively fixed and movable clamping members operable to embrace the edge portion of material therebetween in timed relation to the crimping movement of said crimping heads.

4. Apparatus as in claim 3, including means for moving said relatively movable clamping members in direction to clamp the edge portion against said relatively fixed clamping members simultaneously with forward movement in direction tending to urge the edge portion of material firmly against the aligned jaws of the respective series of links being crimped.

5. Apparatus as in claim 4, wherein said material, upon release of said means for holding the same, is movable with said movable means through links thereon crimped to the material.

6. Apparatus as in claim 5, including indexing means operable progressively to move said movable means a predetermined extent forwardly, and thereby to advance the material a corresponding extent.

7. Apparatus as in claim 2, wherein said material, upon release of said means for holding the same, is movable with said movable means through links thereon crimped to the material.

8. Apparatus as in claim 2, wherein said material, upon release of said means for holding the same, is movable with said movable means through links thereon crimped to the material; including indexing means operable progressively to move said movable means a predetermined extent forwardly, and thereby to advance the material a corresponding extent.

9. Apparatus as in claim 2, including indexing means operable progressively to move said movable means a predetermined extent forwardly, and thereby through connection of crimped links between the movable means and the material to advance the material correspondingly with the movable means.

10. Apparatus as in claim 2, said means for holding including relatively fixed and movable clamping members operable to embrace the edge portion of material therebetween in timed relation to the crimping movement of said crimping heads.

11. Apparatus as in claim 10, including means for moving said relatively movable clamping members in direction to clamp the edge portion against said relatively fixed clamping members simultaneously with forward movement in direction tending to urge the edge portion of material firmly against the aligned jaws of the respective series of links being crimped.

12. Apparatus as in claim 11, wherein said material, upon release of said means for holding the same, is movable with said movable means through links thereon crimped to the material.

13. Apparatus as in claim 12, including indexing means operable progressively to move said movable means a predetermined extent forwardly, and thereby to advance the material a corresponding extent.

References Cited

UNITED STATES PATENTS

| | | | |
|---|---|---|---|
| 1,820,921 | 9/1931 | Potdevin | 29—243.51 |
| 2,162,787 | 6/1939 | Olsen | 29—243.51 |
| 2,167,820 | 8/1939 | Ziller | 29—243.51 |
| 2,220,067 | 11/1940 | Diamond | 29—243.51 |

WILLIAM S. LAWSON, Primary Examiner

L. GILDEN, Assistant Examiner